Nov. 29, 1960          E. C. ROGERS          2,961,740

CHIP ELIMINATOR AND STOCK SAVER PLUG

Filed Aug. 31, 1959          2 Sheets-Sheet 1

INVENTOR.
ERNEST C. ROGERS
BY
*Lindsey and Prutzman*
ATTORNEYS

United States Patent Office 2,961,740
Patented Nov. 29, 1960

2,961,740

CHIP ELIMINATOR AND STOCK SAVER PLUG

Ernest C. Rogers, Cromwell, Conn. (% Centrifugal Equipment Company, Inc., 363 Main St., Middletown, Conn.)

Filed Aug. 31, 1959, Ser. No. 837,078

12 Claims. (Cl. 29—57)

This invention generally relates to a stock saving accessory device for automatic machines, such as multiple spindle lathes and the like, wherein the work stock is automatically advanced to the work tool, and is more particularly concerned with an improved stock saving device of this type for use with hollow work stock.

It is common practice to utilize an automatic chucking device, such as a collet in cooperation with automatically-controlled feed fingers or the like to advance the work stock through the collet of an automatic machine so that a given predetermined amount of work stock is exposed to one or more work tools. For example, a length of tubular stock many feet long that is to be used in the manufacture of ball bearing races is advanced in desired increments by the feed fingers through the collet to present the desired length of tubular stock to the work tools. After the necessary machining operations have been completed, a section of the tubing is cut off, removed and the supply of work stock is again advanced a given increment by the feed fingers to present a new supply of work stock to the work tools. A certain amount of the supply stock will be unusable for the reason that this amount of stock must be held by the chucking device and thus, cannot be operated upon by the tools. An additional amount of work stock is wasted by conventional machines for the reason that the feed fingers, which grasp the outer periphery of the stock, must waste at least that amount of stock that is grasped by the fingers for the reason that this amount of stock cannot be advanced through the chucking device. In addition, many conventional machines waste an additional amount of stock for the reason that the feed fingers do not advance to a position closely adjacent to the feed end of the chucking device. While the total waste from a single piece of work stock is not of substantial significance, the problem of material waste assumes major proportions to machine manufacturers that utilize many such automatic machines and many thousands of sections of tubular feed stock during the course of a year's operation.

It is therefore an object of this invention to provide an accessory stock saving device that materially reduces normal stock waste without interfering with the normal operation of the machine and without requiring material alteration or adjustment to the machine.

It is another object of this invention to provide an improved stock saving device that not only substantially reduces the amount of stock that is wasted by the automatic feed mechanism of a machine, but which also easily and effectively closes the work end of the stock to prevent entrance of cutting chips, oils, etc.

It is a further object of this invention to provide an improved stock saving device and sealing plug that is inserted into the stock at the work end.

It is a still further object of this invention to provide a combination stock saving device and sealing plug that is easily and effectively operated in an automatic manner and which is economical to manufacture and durable in operation.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 5:
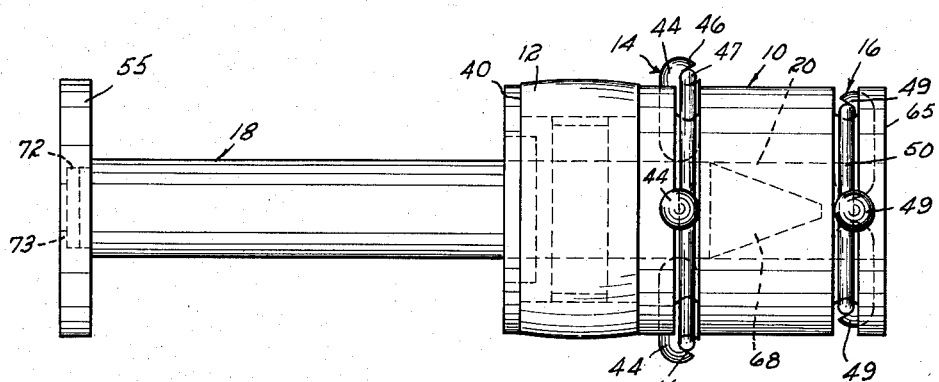
Fig. 5 is a side elevation view of a preferred embodiment of my invention.

Referring to the drawings and particularly Fig. 5, it is seen that a preferred embodiment of my invention generally comprises a cylindrical body member 10 having a sealing belt 12, two spaced rows of radially extending arms 14, 16, and an operating plunger 18 slidably mounted in central longitudinal passageway 20. For the purposes of this invention, the work stock 25 is said to have a work end 26, which is operated upon by appropriate tools in the automatic machine, and a feed end 28 of varying length, and constituting a work piece supply which is fed through the machine.

Figure 1:
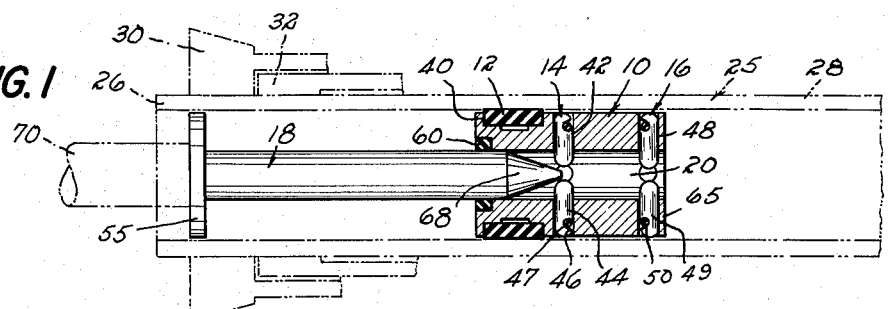
Fig. 1 is a longitudinal cross section of a preferred embodiment of my invention with portions of the automatic machine environment shown in phantom.

Turning first to Fig. 1, it is seen that the work piece 25 is regular tubular stock suitable for making ball bearing races, etc., and that automatically operable collet 30 is diagrammatically shown in phantom and is of conventional structure, as are the feed fingers 32, also shown in phantom. In the normal operation of the conventional machine, the feed fingers move toward and away from the collet 30 and grasp the feed end 28 of work stock 25 at the beginning of the forward stroke to move work end 26 of stock 25 forward in synchronism with the opening of collet 30 and into the work area a predetermined amount.

The preferred embodiment of my improved stock saving and plugging device is provided with a cylindrical body 10, having an axial or longitudinal length that is determined in part by the amount of stock that is desired to be saved. As hereinafter more fully described, the longitudinal distance between the row of pins 14 and the row of pins 16 is generally determinative of the amount of stock that is to be saved. The forward portion of body member 10 head of row 14 is determined by the nature of sealing that is to be provided and is of sufficient length to support plunger 18 in the non-operative position. Body member 10 has a cross section diameter slightly less than the inside diameter of work stock 25 so that the device fits inside of the work stock. Adjacent its forward end there is provided a groove 40 in which is disposed the sealing belt 12, formed of any desired resilient material having resistance to cutting oils, etc. Groove 40 has a width slightly less than that of belt 12 so that, upon insertion of belt 12 into groove 40, belt 12 expands or bows outwardly of the body member by an amount sufficient to establish good sealing contact with the inside wall of work stock 25. Adjacent groove 40 there is provided four radially-extending passageways 42, spaced at 90° intervals about the periphery of body member 10. These passageways extend inwardly into communication with central passageway 20 and have positioned therein pins or arms 44. Each pin 44 is provided with a notch or groove 46, so that flexible O-ring 47 engages each pin and biases it radially inwardly to a retracted position wherein a portion of the inner end of each pin extends into central passageway 20. In a similar manner, body member 10 is provided with four radially-extending passageways 48, in which are disposed the pins 49, also biased inwardly by an O-ring 50. It is noted that the periphery of body member 10, aligned with passageways 42 and 48, is grooved to permit the O-rings 47 and 50 to be positioned below the outer surface of body member 10 when the pins are in the retracted position.

To provide controlled radial movement of pins 44 and 49, plunger 18 is slidably mounted in passageway 20. In the preferred embodiment, sealing ring 60 is mounted about the entrance to passageway 20 and is dimensioned to closely engage plunger 18 to effect sealing engagement therewith. Thus, plug 10, belt 12, sealing ring 60, and plunger 18 cooperate to seal work piece 25 against the entrance of cutting fluid, etc., which would normally flow through the work piece 25. To further seal work piece 25 and to prevent the entrance of large metal chips which might injure ring 60 or belt 12, there is provided on the leading or forward end of plunger 18 a disc-like head 55 having a diameter slightly less than the inside diameter of work piece 25.

Figure 2:
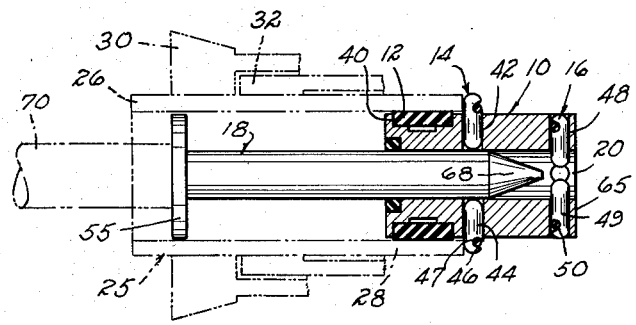
Fig. 2 is a longitudinal cross section of the embodiment of Fig. 1 during operation thereof.
Figure 3:
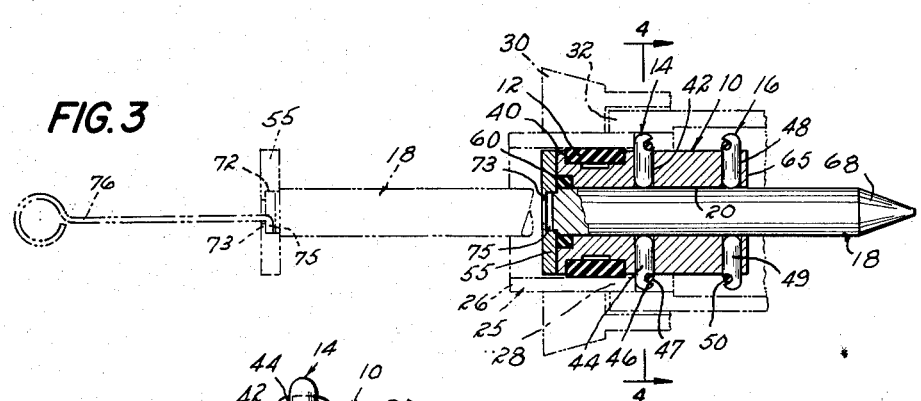
Fig. 3 is a longitudinal cross section of the embodiment of Fig. 1 in the fully operated position and with the withdrawing operation set forth in phantom.
Figure 4:
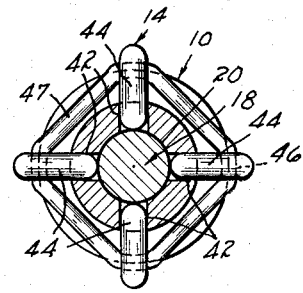
Fig. 4 is a cross section view taken along the lines 4—4 of Fig. 3.

Further details of the construction and operation can best be understood by referring to Figs. 1-3, and a description of the operation of my device. After work stock 25 has been advanced by the feed mechanism 32 to position the desired amount of stock on the work end 26 outside of collet 30, my device, with plunger extended and pins retracted (as shown in Fig. 1) is inserted into work end 26 and pushed into the passageway of hollow work stock 25 until the device is fully contained within the work stock. With pins 44 and 49 retracted, the end 65 slips easily into work stock 25 because the diameter of body member 10 is less than the inside diameter of the work stock, and pins 44 and 49 are retracted to a position that is at least flush with the outer surface of body member 10. Continued forward movement causes belt 12 to be compressed into sealing engagement with the inside surface of work stock 25 and to provide frictional resistance to further movement. Once pins 44 and 49 are within work stock 25, the necessary forward movement is provided simply by pushing head 55 of plunger 18 to overcome the frictional resistance provided by belt 12. Pointed end 68 of plunger 18 cannot pass pins 44 for the reason that pins 44 engage the inside surface of work stock 25. Boring tool, or pusher 70, is positioned on the machine frame and engages head 55 so as to prevent head 55 and body member 10 from moving forward when work stock 25 is advanced through collet 30 by feed fingers 32. In the preferred embodiment, head 55 is positioned in approximate alignment with collet 30 by tool 70.

The machine functions in its normal manner, advancing and operating upon work stock 25 until feed end 28 is fed to the position shown in Fig. 2 wherein a portion of body member 10 and pins 44 and 49 are positioned outside of feed end 28. The frictional engagement of belt 12 with the inner periphery of feed end 28 provides a holding force greater in magnitude than the sum of the forces necessary to move plunger 18 relative to collar 60 and to overcome the inward bias of the pins 44 and 49 provided by the O-rings. In this position, continued forward movement of work stock 25 causes pointed end 68 of plunger 18 (which is held against forward movement by tool 70) to lift pins 44 and move them radially outwardly to a position determined by the diameter of plunger 18. Since pins 44 move outwardly as soon as they clear the feed end 28, they will be positioned in close abutting engagement with feed end 28. Continued forward movement of feed end 28 causes pointed end 68 of plunger 18 to engage and move pins 49 radially outwardly also.

It is noted that the pins 44 have a radial length such that, when fully extended, they project at least slightly beyond the inside surface of the work stock so as to engage the end and prevent forward movement of body member 10 relative to work stock 25. The fully extended position of pins 49 is such that the distance between the ends of opposing pins is at least equal to the outside diameter of work stock 25. To state this another way, the distance of the outer end of pin 49 from the central axis of work piece 25 is at least equal to the outside radius of the work stock.

In the preferred embodiment, the pins 44 and 49 are of the same length and, when in the extended position, project slightly beyond the outside diameter of the work stock so as to preclude entrance of body member 10 and its associated apparatus into collet 30.

In the solid line portion of Fig. 3, a plunger 18 is shown fully advanced into body member 10 by tool 70 and pins 44 and 49 are in position to be grasped by feed fingers 32 to permit advancing feed end 28 of work stock 25 an additional amount into collet 30, which amount is approximately equal to the spacing between fingers 44 and 49. Thus, additional work stock can be operated upon by the tool in front of collet 30. The plugging or sealing effect of my device remains unimpaired by the operation of the stock saving features.

In order to permit withdrawal of my improved stock saver from the work end of the machine, I provide a radial groove 72, defining a lip 73 adjacent the forward end of head 55 on plunger 18. Bent over end of tool 76 is placed in groove 72 to permit plunger 18 to be partially withdrawn from body member 10 to enable pins 44 and 49 to be returned to the retracted position by the rubber O-rings. Once the pins have assumed the retracted position, the remaining piece of scrap stock and my stock saving device is easily removed from the machine.

From the foregoing description of the embodiment of my invention, it is apparent that I have provided a combination plug and stock saving device, which is inserted into the work end of the stock, the position most convenient to the operator. Because the plug is always positioned adjacent the work end of the stock, cutting fluids, etc. are not permitted to travel the full length of the work piece so as to permit escape of cutting fluids from the feed end. In addition, it is seen that my improved device permits substantial stock saving without any alteration to the machine itself or any change in the operation of the machine. The device is easily manufactured and installed, virtually foolproof in operation, and extremely durable.

As will be apparent to persons skilled in the art, various modifications and adaptations of the structure above described will become readily apparent without departure from the spirit and scope of the invention, the scope of which is defined in the appended claims.

I claim:

1. A device for increasing the effective length of hollow work stock that is automatically fed lengthwise into a machine comprising an elongated body member dimensioned to fit within and be movable along its longitudinal axis into the hollow work stock, an arm mounted on said body member for movement from a retracted position wherein the radial distance of the end of the arm from the work stock longitudinal axis is not greater than the inside radius of the work stock to an extended position wherein the radial distance of the outer end of the arm from the work stock longitudinal axis is at least equal to the outside radius of the work stock, and means operative to move said arm to the extended position.

2. A device for increasing the effective length of hollow work stock that is automatically fed lengthwise into a machine comprising an elongated body member dimensioned to fit within and be movable along its longitudinal axis into the hollow work stock, two arms mounted on said body member for movement from a retracted position wherein the radial distance of the end of each of said arms from the work stock longitudinal axis is not greater than the inside radius of the work stock to an extended position wherein the radial distance of the outer end of the arm from the work stock longitudinal axis is at least equal to the outside radius of the work stock, one of said arms being positioned adjacent one end of said body member, the other of said arms being spaced therefrom along the longitudinal axis of the body member, and means operative to move said feed arms to the extended position.

3. A device for increasing the effective length of hollow work stock that is automatically fed lengthwise into a machine comprising an elongated body member dimensioned to fit within and be movable along its longitudinal axis into the hollow work stock, first and second arms mounted on said body member for movement from a retracted position wherein the radial distance of the end of said arms from the work stock longitudinal axis is not greater than the inside radius of the work stock to an extended position wherein the radial distance of the outer ends of said arms from the work stock longitudinal axis is at least equal to the outside radius of the work stock, said first arm being positioned adjacent one end of said body member, said second arm being spaced from said first arm along the longitudinal axis of said body member, a central longitudinally extending passageway in said body member and a plunger positioned therein, said plunger being movable into said passageway to cause movement of said first and second arms from said retracted position to said extended position.

4. A device for increasing the effective length of hollow work stock that is automatically fed lengthwise into a machine comprising an elongated cylindrical body member having a cross section dimensioned to fit within the hollow work stock and having an axially extending passageway formed therein, first and second arms mounted on said body member for movement from a retracted position wherein a portion of the arm extends into said passageway and the radial distance of the end of each of said arms from the work stock longitudinal axis is not greater than the inside radius of the work stock, means biasing said arms into the retracted position, and a plunger mounted on said body member passageway, said plunger being movable to engage said arms to move said arms to an extended position wherein the radial distance of the outer end of each of said arms from the work stock longitudinal axis is at least equal to the outside radious of the work stock, one of said arms being positioned adjacent one end of said body member, the other of said arms being spaced from said first arm along the longitudinal axis of the body member.

5. A device for increasing the effective length of hollow work stock that is automatically fed lengthwise into a machine comprising an elongated cylindrical body member having a diameter less than the inside diameter of the hollow work stock, a belt of resilient material disposed about a circumference of said body member, said belt being arranged in sealing engagement with said body member and having an outside diameter greater than the inside diameter of the hollow work stock so as to effect sealing engagement therewith, an axial passageway in said body member, a first arm mounted on said body member adjacent one end thereof, a second arm mounted on said body member in a position longitudinally spaced from said first arm, each of said arms being movable from a retracted position wherein a portion of the arm extends into said axial passageway and wherein the radial distance of the end of the arm from the longitudinal axis of body member is not greater than the inside radius of the work stock to an extended position wherein the radial distance of the outer end of the arm from the longitudinal axis of the body member is at least equal to the outside radius of the work stock, a plunger movably mounted in said central passageway to engage and move said arms to the extended position, and sealing means positioned in said passageway and engageable with said plunger.

6. A device for increasing the effective length of hollow work stock that is automatically fed lengthwise into a machine comprising a cylindrical body member having an axial passageway extending therethrough, said cylindrical body member having an outside diameter less than the inside diameter of the hollow work stock, a belt of resilient sealing material disposed about a circumference of said body member and engageable with the inside wall of the hollow work stock, a first arm mounted adjacent one end of said body member, a second arm mounted on said body member in a position longitudinally spaced from said first arm, each of said arms being movable from a retracted position wherein a portion of the arm extends into said body member passageway and wherein the radial distance of the end of the arm from the longitudinal axis of the body member is not greater than the inside radius of the work stock, a plunger mounted in said passageway, means establishing sealing engagement between said plunger and said body member, said plunger being movable to engage said arms to move said arms to an extended position wherein the radial distance of the outer end of each arm to the longitudinal axis of the body member is at least equal to the outside radius of the work stock, and a head of circular cross section mounted on the work end of said plunger, said head having a diameter slightly less than the inside diameter of the hollow work stock.

7. A device for increasing the effective length of hollow work stock that is automatically fed lengthwise into a machine comprising a cylindrical body member having an axial passageway extending therethrough, said cylindrical body member having an outside diameter less than the inside diameter of the hollow work stock, a belt of resilient sealing material disposed about a circumference of said body member and engageable with the inside wall of the hollow work stock, a first circumferential row of a plurality of arms mounted adjacent one end of said body member, a second circumferential row of a plurality of arms mounted on said body member in a position longitudinally spaced from said first row of arms, each of said arms being movable from a retracted position wherein a portion of the arm extends into said body member passageway and wherein the radial distance of the end of each arm from the longitudinal axis of the body member is not greater than the inside radius of the work stock, a plunger mounted in said passageway, means establishing sealing engagement between said plunger and said body member, said plunger being movable to engage each of said arms to move said arms to an extended position wherein the radial distance from the outer end of each arm to the longitudinal axis of the body member is at least equal to the outside radius of the work stock, and a head of circular cross section mounted on the work end of said plunger, said head having a diameter slightly less than the inside diameter of the hollow work stock.

8. The device as set forth in claim 7 wherein a radially extending ledge is provided on the outside face of the head on said plunger, said ledge being engageable to permit withdrawal of the plunger from the passageway in said cylindrical body member.

9. The device as set forth in claim 7 wherein the plunger is provided with an inwardly tapering end engageable with said arms, said inwardly tapering end acting as a cam surface to urge said arms outwardly of the body member.

10. The device as set forth in claim 6 wherein the radial distance of the outer end of each arm to the longitudinal axis of the body member when said arm is in the extended position is slightly greater than the outside radius of the work stock.

11. A device for increasing the effective length of hollow work stock that is automatically fed lengthwise into a machine comprising a cylindrical body member having a longitudinally extending passageway, said cylindrical body member having an outside diameter less than the inside diameter of the hollow work stock, a belt of resilient sealing material disposed about a circumference of said body member and engageable with the inside wall of the hollow work stock, a first row of a plurality of pins mounted adjacent one end of said body member for radial movement relative thereto, a second row of a plurality of pins mounted on said body member for radial movement relative thereto in a position longitudinally spaced from said first row of pins, each of said pins having a retracted position wherein the portion of the pin extends into said body member passageway and wherein the radial distance of the end of the pin from the longitudinal axis of the body member is not greater than the inside radius of the work stock, a plunger mounted in said passageway, means establishing sealing engagement between said plunger and said body member, said plunger having a tapered end movable into engagement with said pins to move each of said pins to an extended position wherein the radial distance of the outer end of each pin to the longitudinal axis of the body member is at least equal to the outside radius of the work stock, and a head of circular cross section mounted on the work end of said plunger, said head having a diameter slightly less than the inside diameter of the hollow work stock.

12. The device as set forth in claim 11 wherein the radial distance of the outer end of each pin to the longitudinal axis of the body member, when in the extended position, is slightly greater than the outside radius of the work stock.

No references cited.